US007331791B2

(12) United States Patent
Rowley et al.

(10) Patent No.: US 7,331,791 B2
(45) Date of Patent: Feb. 19, 2008

(54) SYSTEM AND METHOD FOR EVALUATING A PERSON'S INFORMATION TECHNOLOGY SKILLS (75) Inventors: David D. Rowley, Spanish Fork, UT (US); Thomas K. Christensen, Santaquin, UT (US); Jeffrey A. Fischer, Provo, UT (US); Craig R. Jenkins, Orem, UT (US); Keith L. Jenkins, Lehi, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 10/087,977

(22) Filed: Mar. 5, 2002

(65) Prior Publication Data
US 2003/0138759 A1 Jul. 24, 2003

(51) Int. Cl.
*G09B 19/10* (2006.01)
(52) U.S. Cl. ...................................................... 434/224
(58) Field of Classification Search ................ 434/118, 434/219, 262, 267, 224, 322, 307 R, 236, 434/350
See application file for complete search history.

(56) References Cited

U.S. PATENT DOCUMENTS

| 36,462 | A | * | 9/1862 | Chang et al. .................... 76/56 |
| 5,310,349 | A | | 5/1994 | Daniels et al. ............... 434/350 |
| 5,511,217 | A | | 4/1996 | Nakajima et al. ............ 395/800 |
| 5,553,291 | A | | 9/1996 | Tanaka et al. ............... 395/700 |
| 5,572,694 | A | | 11/1996 | Uchino |
| 5,602,982 | A | * | 2/1997 | Judd et al. .................... 345/709 |
| 5,621,912 | A | * | 4/1997 | Borruso et al. ................. 718/1 |
| 5,704,791 | A | * | 1/1998 | Gillio .......................... 434/262 |
| 5,743,743 | A | | 4/1998 | Ho et al. ...................... 434/236 |
| 5,823,781 | A | | 10/1998 | Hitchcock et al. ........... 434/118 |
| 5,827,070 | A | | 10/1998 | Kershaw et al. ............. 434/322 |
| 5,909,545 | A | | 6/1999 | Frese, II et al. ......... 395/200.38 |
| 5,953,536 | A | | 9/1999 | Nowlin, Jr. ............... 395/750.05 |
| 6,033,226 | A | | 3/2000 | Bullen ......................... 434/219 |
| 6,075,938 | A | * | 6/2000 | Bugnion et al. .............. 703/27 |

(Continued)

OTHER PUBLICATIONS

"*Technical White Paper*", VMware, Inc., Feb. 1999, 9 pages.

(Continued)

*Primary Examiner*—Robert E Pezzuto
(74) *Attorney, Agent, or Firm*—Pillsbury Winthrop Shaw Pittman, LLP (57) ABSTRACT An IT skills evaluation system and method for evaluating an individual's IT skills. According to one aspect of the invention, the individual is required to perform one or more practical exercises. A practical exercise is an evaluation device for evaluating not only an individual's knowledge, but also the individual's ability to apply their knowledge. One or more virtual machines are associated with each practical exercise, and the test taker must use these virtual machines to complete the exercise. In one aspect, a skills evaluation system according to one embodiment includes a testing computer on which the following software is installed: a virtual machine platform for allowing multiple virtual machines to run simultaneously on the testing computer and a practical skills evaluator for presenting exams to a test taker and scoring the exam. An exam is made up of one or more practical exercise. When the practical skills evaluator presents the practical exercise to the test taker the evaluator launches the one or more virtual machines so that the user can perform the exercise.

31 Claims, 6 Drawing Sheets

U.S. PATENT DOCUMENTS

| | | | |
|---|---|---|---|
| 6,099,320 A | 8/2000 | Papadopoulos | 434/322 |
| 6,135,776 A | 10/2000 | Erturk et al. | 434/276 |
| 6,149,438 A | 11/2000 | Richard et al. | 434/322 |
| 6,149,441 A | 11/2000 | Pellegrino et al. | 434/350 |
| 6,157,808 A | 12/2000 | Hollingsworth | 434/350 |
| 6,162,060 A | 12/2000 | Richard et al. | 434/118 |
| 6,190,178 B1 | 2/2001 | Oh | 434/323 |
| 6,223,202 B1 | 4/2001 | Bayeh | 709/102 |
| 6,256,637 B1 | 7/2001 | Venkatesh et al. | 707/103 |
| 6,260,068 B1 | 7/2001 | Zalewski et al. | |
| 6,269,409 B1 | 7/2001 | Solomon | 709/329 |
| 6,301,462 B1 | 10/2001 | Freeman et al. | 434/350 |
| 6,325,631 B1 | 12/2001 | Kouba et al. | 434/219 |
| 6,341,212 B1 | 1/2002 | Shende et al. | 434/350 |
| 6,341,960 B1 | 1/2002 | Frasson et al. | 434/322 |
| 6,345,311 B1* | 2/2002 | Breslau et al. | 719/310 |
| 6,370,355 B1 | 4/2002 | Ceretta et al. | 434/350 |
| 6,371,765 B1* | 4/2002 | Wall et al. | 434/224 |
| 6,505,031 B1 | 1/2003 | Slider et al. | 434/350 |
| 6,514,085 B2 | 2/2003 | Slattery et al. | 434/335 |
| 6,519,445 B2 | 2/2003 | Casey-Cholakis et al. | 434/350 |
| 6,594,466 B1 | 7/2003 | Harned et al. | 434/350 |
| 6,622,003 B1 | 9/2003 | Denious et al. | 434/350 |
| 6,652,283 B1 | 11/2003 | Van Schaack et al. | |
| 6,652,287 B1 | 11/2003 | Strub et al. | 434/365 |
| 6,674,992 B2 | 1/2004 | Helmick et al. | |
| 6,704,541 B1 | 3/2004 | Ciarallo et al. | |
| 6,733,295 B2 | 5/2004 | Stuppy et al. | 434/322 |
| 6,766,311 B1* | 7/2004 | Wall et al. | 706/46 |
| 6,790,045 B1 | 9/2004 | Drimmer | 434/336 |
| 6,871,043 B2 | 3/2005 | Sanda | 434/307 R |
| 6,928,260 B2 | 8/2005 | Betz et al. | 434/350 |
| 6,941,105 B1* | 9/2005 | Rowley et al. | 434/350 |
| 6,965,752 B2 | 11/2005 | Allen et al. | 434/362 |
| 6,988,138 B1 | 1/2006 | Alcorn et al. | 709/225 |
| 7,013,325 B1 | 3/2006 | Vivian et al. | 709/203 |
| 7,029,280 B2 | 4/2006 | Krebs et al. | 434/118 |
| 7,153,140 B2 | 12/2006 | Ivanir et al. | 434/322 |
| 2002/0065926 A1 | 5/2002 | Hackney et al. | 709/231 |
| 2002/0072049 A1 | 6/2002 | Prahalad | 434/365 |
| 2002/0082823 A1 | 6/2002 | Traut | 703/27 |
| 2002/0099876 A1 | 7/2002 | Bui et al. | 710/4 |
| 2002/0103882 A1* | 8/2002 | Johnston et al. | 709/218 |
| 2002/0115049 A1* | 8/2002 | Roschelle et al. | 434/350 |
| 2002/0124127 A1 | 9/2002 | Dawkins et al. | 710/200 |
| 2002/0128806 A1* | 9/2002 | Anderson et al. | 703/2 |
| 2002/0129212 A1 | 9/2002 | Lee et al. | 711/152 |
| 2002/0192623 A1* | 12/2002 | Sather et al. | 434/118 |
| 2002/0194437 A1 | 12/2002 | Kapoor et al. | 711/153 |
| 2003/0014738 A1 | 1/2003 | Dawkins et al. | 717/131 |
| 2003/0028523 A1 | 2/2003 | Brown et al. | 707/3 |
| 2003/0033512 A1 | 2/2003 | Austen et al. | 713/2 |
| 2003/0056155 A1 | 3/2003 | Austen et al. | 714/45 |
| 2003/0061260 A1 | 3/2003 | Rajkumar | 709/104 |
| 2003/0061540 A1 | 3/2003 | Lee et al. | 714/31 |
| 2003/0091968 A1* | 5/2003 | Eggert et al. | 434/262 |

OTHER PUBLICATIONS

Munro, Jay, "Virtual Machines & VMware, Part I", www.extremetech.com/print_article, Dec. 21, 2001, 12 pages.

"VMware Launches Third Generation of Award-Winning Desktop Virtualization Software", www.vmware.com/news/releases/ws3.html, printed Dec. 18, 2001, 3 pages.

"Virtual Network Computing", www.uk.research.att.com/vnc/, printed Jan. 4, 2002, 2 pages.

"E-Business Applications; On-The-Net Training", www.internetweek.com/ebizapps01/ebiz043001-2.htm, Apr. 30, 2001, 2 pages.

McCracken, Stuart et al., "Real Laboratories for Distance Education", McGill University, Dept. ECE, 10 pages.

Wielbut, Vlad, "World Wide Web Elementary; Technologies for Creating Complex Learning Environments on the Web", www.communitytechnology.org/distance_ed/, May 13, 1998, 8 pages.

Dodge, Bernie, Ph.D., "Distance Learning on the World Wide Web", http://edweb.sdsu.edu/people/bdodge/ctptg/ctptg.html, Last updated Nov. 1, 1995, 17 pages.

"Hands-On Labs", www.handsonlabs.com/Products/products.html, printed Jan. 4, 2002, 1 page.

"Certified Directory Engineer—Practicum," Novell, www.novell.com/inc/pf/pf.jsp, printed Feb. 12, 2002, 5 pages.

"Beyond the Basics: The Excel 2000 Expert Exam," http://certcities.com/certs/mous/exams/story.asp?EditorialsID=16, printed Feb. 28, 2002, 5 pages.

"Project 2000 Core Exam," http://certcities.com/certs/mous/exams/story.asp?EditorialsID=37, printed Feb. 28, 2002, 4 pages.

"MOUS Certification," www.microsoft.com/traincert/mcp/mous/mous.asp, printed Feb. 28, 2002, 2 pages.

Nieh, Jason, et al., "Examining VMware", Dr. Dobb's Journal, vol. 25, No. 8, Aug. 2000, pp. 70, 72-74, and 76.

* cited by examiner

SYSTEM AND METHOD FOR EVALUATING A PERSON'S INFORMATION TECHNOLOGY SKILLS

CROSS REFERENCE TO RELATED APPLICATIONS

This application is related to U.S. patent application Ser. No. 10/060,345, filed on Feb. 1, 2002, and U.S. patent application Ser. No. 10/085,248, filed on Feb. 26, 2002, both of which are assigned to the same assignee as that of the present invention and are incorporated herein by this reference.

BACKGROUND OF THE INVENTION

1. Field of the Invention

The present invention is related to the field of evaluating a person's information technology (IT) skills.

2. Discussion of the Background

Today's businesses are extremely reliant on information technology (e.g., computers and other processing equipment) for many tasks. Consequently, when a business experiences a problem with a critical IT component (e.g., directory services, E-mail servers, web servers, or other IT components), the business may be adversely affected. Accordingly, businesses seek to hire one or more employees who have an expertise in certain computer-related areas to make sure that the business' IT systems run smoothly.

Most employers do not have the means for determining whether a potential employee has the necessary computer skills for a particular job. Consequently, these employers rely on IT certification organizations who certify individuals that possess a minimum amount of IT skill. That is, an employer may not hire a potential employee unless the potential employee has been certified for a particular skill by a well known certification organization.

Accordingly, these certification organizations must develop tests for determining whether an individual should be certified. That is, whether the individual not only has the requisite IT knowledge, but also the ability to apply the knowledge to real world problems.

Unfortunately, conventional IT certification tests may perform well at evaluating a person's IT knowledge, but are inadequate in other respects, such as when it comes to evaluating the person's IT skills (i.e., the person's knowledge as well as how well the person can apply their knowledge to solving real world problems). Other drawbacks exist.

SUMMARY OF THE INVENTION

The present invention aims to provide an IT skills evaluation system and method for evaluating an individual's IT skills, such as, for example, the individual's ability to solve a particular computer problem, load new software onto a computer, configure existing software on a computer, configure a computer's hardware devices, etc. According to one aspect of the invention, the individual is required to perform one or more practical exercises. A practical exercise is an evaluation device for evaluating not only an individual's knowledge, but also the individual's ability to apply his/her knowledge. According to one embodiment, one or more virtual machines are associated with each practical exercise, and the test taker uses the virtual machines in performing the exercise. Other implementations may be used.

According to one aspect of the invention, a skills evaluation system includes a testing computer on which at least the following software is installed: a virtual machine platform for allowing virtual machines to run on the testing computer and a practical skills evaluator for evaluating practical skills, for example, by presenting exams to a test taker and scoring the exam. An exam is made up of one or more exam items. An exam item may include a question (e.g., a multiple choice question, essay question or other question) that the test taker is asked to answer. Additionally, an exam item may include a practical exercise that the test taker is asked to perform. Advantageously, a practical exercise includes a scenario and one or more tasks that the user is asked to complete based on the scenario.

If a test taker takes an exam that includes a practical exercise, then, when the practical exercise is presented to the test taker, the practical skills evaluator (a) displays to the test taker information that describes the exercise's scenario and tasks that the test taker must complete to successfully perform the exercise, and (b) launches on the testing computer the one or more virtual machines that are associated with the exercise. The virtual machines are pre-configured so that they will have the necessary utilities and provide the necessary functions for the test taker to complete the tasks. Preferably, the virtual machines are placed into an initial, predetermined state after being launched. For example, a suspended state file may be created for each of the virtual machines so that, after a virtual machine is launched, the virtual machine is placed automatically into the initial predetermined state.

After the virtual machines are launched, the test taker performs the tasks, which typically require the test taker to change the state of one or more of the virtual machines by, for example, installing a piece of software on one of the virtual machines, configuring an existing piece of software installed on the virtual machine, configuring a hardware device "connected" to the virtual machine, modifying a system configuration file, or making some other change to the virtual machine.

After completion of the practical exercise (e.g., after the test taker indicates that he/she has completed the exercise or after a predetermined amount of time has elapsed from whence the exercise was presented to the test taker), the practical skills evaluator examines the state of the virtual machines (i.e., the changes the test taker made to the virtual machine) to determine whether the test taker completed the required tasks. The practical skills evaluator may also examine the state of the virtual machines to determine whether the test taker modified one or more of the virtual machines in a way that was not required.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
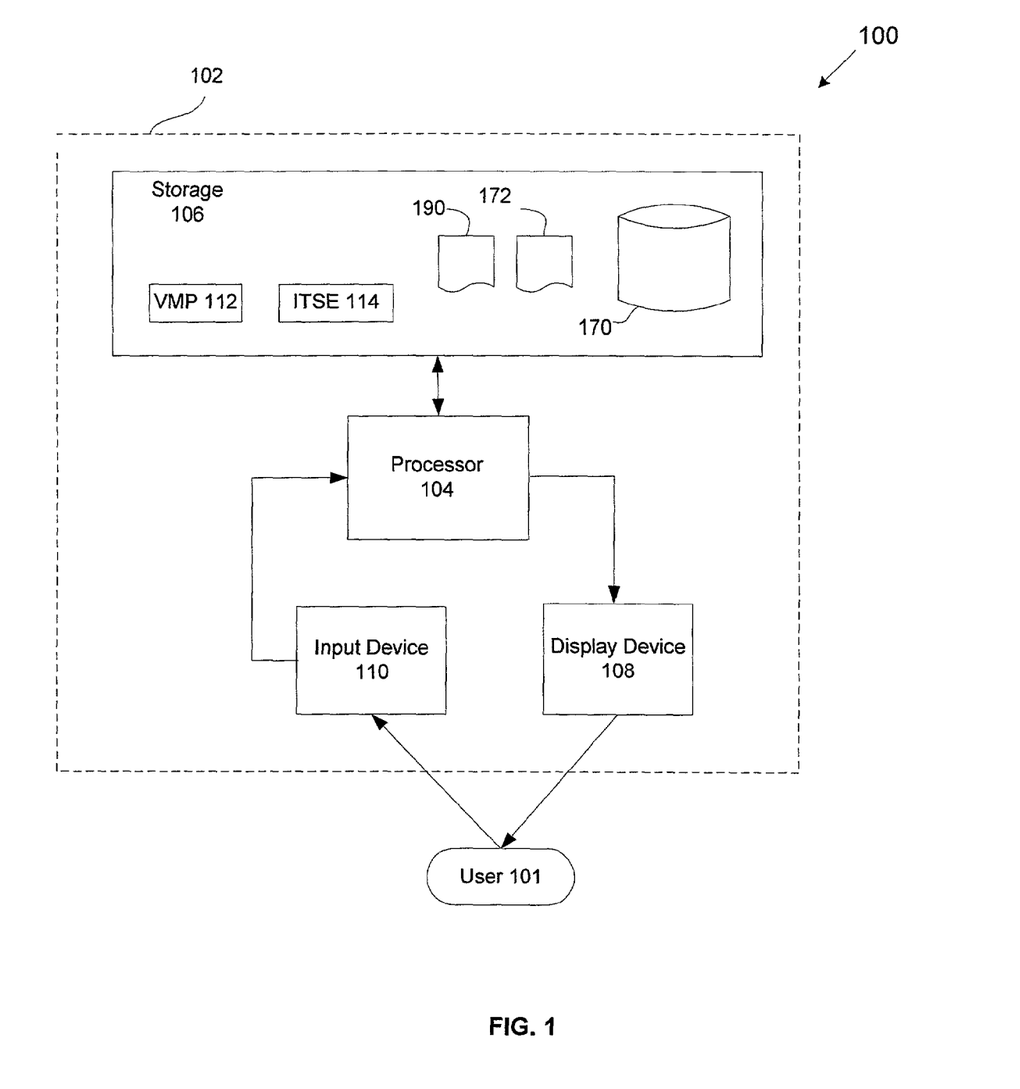
FIG. 1 is a functional block diagram of an IT skills evaluation system, according to one embodiment, for evaluating a user's IT skills.

FIG. 1 is a functional block diagram of a system 100, according to an embodiment of the present invention, for evaluating user 101's IT skills. System 100 includes a testing computer system 102 that includes: a processor 104 for executing software, a storage medium 106 (e.g., hard disk, optical disk, or other storage medium) for storing data, software, and/or other information; a display device 108 for displaying information to a user 101, and an input device 110 (e.g., keyboard, mouse, voice recognition device, and/or other input device) that enables system 102 to receive input from user 101.

Computer system 102 includes a virtual machine platform (VMP) 112, which comprises virtual machine software for allowing multiple virtual machines to run simultaneously on computer system 102. Each virtual machine may execute the same or a different operating system. For example, one virtual machine may be configured to run the UNIX operating system, whereas another may be configured to run the Windows NT® operating system. Computer system 102 further comprises an IT skills evaluator (ITSE) 114 for evaluating a test taker's (e.g., user 101's) IT skills. Preferably, ITSE 114 comprises software for presenting exams to the test taker and scoring the exam. Both VMP 112 and ITSE 114 may be stored on storage medium 106 (or elsewhere) and may be executed by processor 104.

When processor 104 executes software 112 and 114, computer system 102 is operable to: (a) present a practical exercise to user 101, which includes launching the one or more virtual machines that are associated with the practical exercise so that the user can perform the exercise using the virtual machines; (b) wait for completion of the exercise (e.g., for the user to complete the exercise, for a time-out to occur, or other completion event); and (c) evaluate how well user 101 completed the practical exercise. A practical exercise may include a scenario and one or more tasks that the user is asked to perform based on the scenario.

In one embodiment, system 102 presents a practical exercise to user 101 by displaying information (e.g., text, graphics, sound, and/or other information) to the user that describes the practical exercise's scenario and tasks that user 101 must perform to successfully complete the exercise. In one embodiment, system 102 evaluates how well user 101 completed the practical exercise by examining the state into which the user put the virtual machines and comparing the state of the virtual machines to a benchmark state. In this way, system 102 determines whether user 101 completed the required tasks and whether user 101 modified a virtual machine in a way that was not required.

Figure 2:
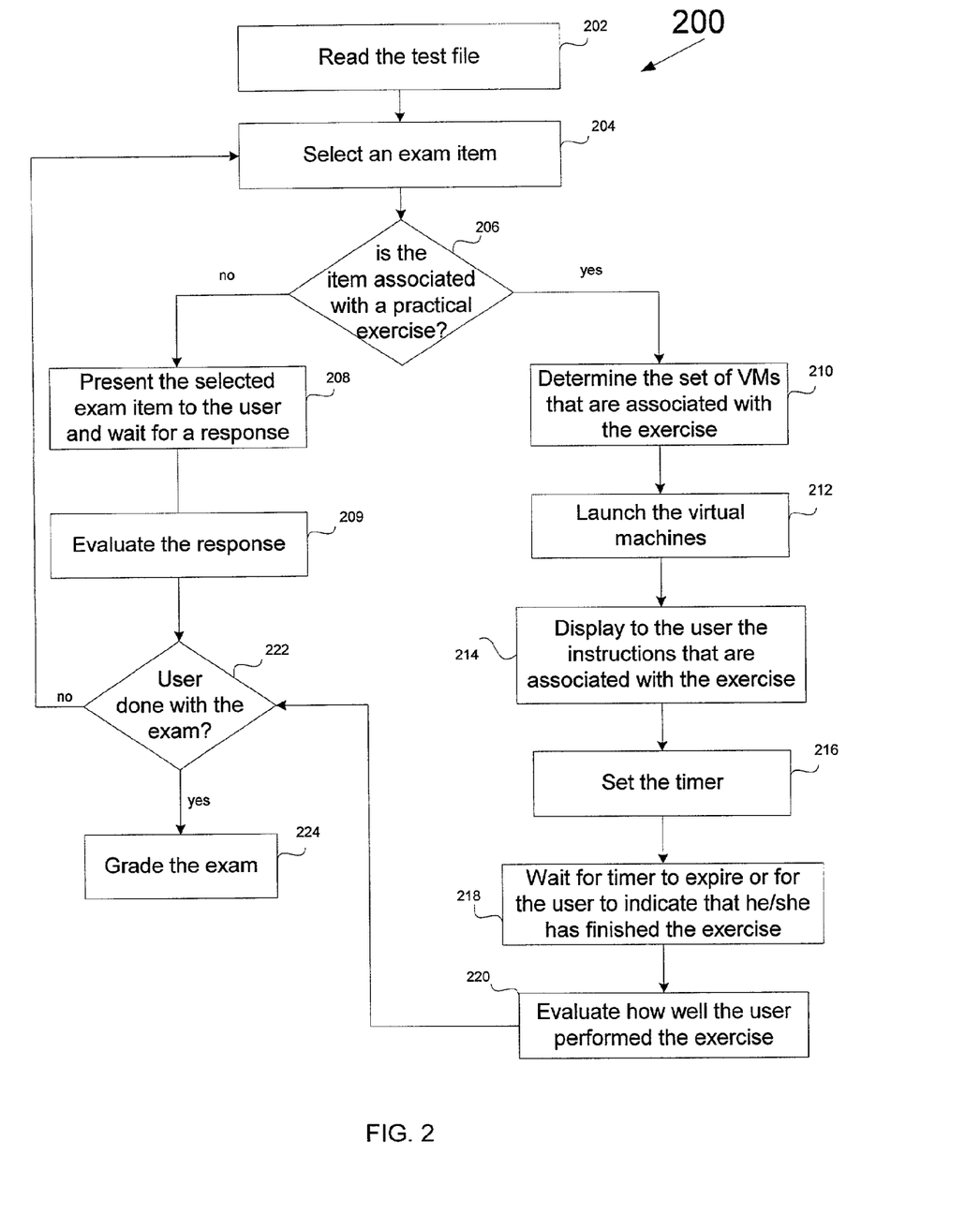
FIG. 2 is a flow chart illustrating a process, according to one embodiment, that is performed by the IT skills evaluator.

FIG. 2 is a flow chart illustrating a process 200 that is implemented by ITSE 114 according to one embodiment. Process 200 may begin in step 202, where ITSE 114 reads a test file 190. Test file 190 specifies an exam. An exam includes one or more exam items. An exam item may be a question, a practical exercise, or other exam item. A question may be a multiple choice question, an essay question or other question that user 101 is asked to answer. A practical exercise is an exercise that user 101 is asked to perform. A practical exercise is associated with one or more virtual machines. Each of the one or more virtual machines is associated with a set of one or more virtual machine files 172. In one embodiment, virtual machines files 172 include, at the least, a disk image file (a.k.a., "virtual disk file"). Preferably, a suspended state file and/or other files are also included in file set 172. The disk image file stores the virtual machine's operating system, applications, data files, etc.

In step 204, ITSE 114 selects an exam item specified in test file 190 (or user 101 selects the exam item). In step 206, ITSE 114 determines whether the selected exam item is associated with a practical exercise. If it is associated with a practical exercise, then control passes to step 210, otherwise control passes to step 208.

In step 208, ITSE 114 presents the item (e.g., exam question) to user 101 and waits for user 101 to provide a response. In step 209, ITSE 114 evaluates the response (e.g., ITSE 114 determines whether user 101 correctly answered the question). After step 209, control passes to step 222.

In step 210, ITSE 114 determines the virtual machines that are associated with the practical exercise. In one embodiment, a database 170 is employed to associate practical exercises with virtual machine identifiers that identify the virtual machines with which the practical exercises are associated. In this embodiment, ITSE 114 uses database 170 to determine the virtual machines that are associated with the practical exercise.

In step 212, ITSE 114 launches the one or more virtual machines determined in step 210. The virtual machines are pre-configured so that they will have the necessary software, utilities, etc. and provide the necessary functions for user 101 to complete the tasks required by the practical exercise. Advantageously, a suspended state file may be created for each of the virtual machines so that, after a virtual machine is launched, the virtual machine is placed automatically into a particular state defined by the virtual machine's suspended state file. In this way, user 101 can be presented with a well controlled testing environment. For example, in a practical exercise that describes a scenario in which a computer is unable to access the Internet and the task required of user 101 is to fix this problem, then a suspended state file associated with one or the exercise's virtual machines may be pre-configured so that when the virtual machine is presented to user 101 the virtual machine's IP routing table has incorrect information. In this way, the virtual machine emulates the "problem" described in the scenario, and user 101's IT skills are evaluated by seeing if user 101 can modify the virtual machine's routing table to fix the problem.

In step 214, ITSE 114 displays to user 101 information that is associated with the practical exercise. This information may be retrieved from database 170 where it is stored and associated with the practical exercise. The information describes the practical exercise's scenario and the tasks that user 101 must perform to successfully complete the exercise. At this point, user 101 performs the tasks, which typically require user 101 to delete, create, and/or modify one or more particular files stored within one or more of the virtual machines' disk image files (i.e., configure a piece of software installed on a virtual machine or a hardware device "connected" to a virtual machine).

In step 216, ITSE 114 sets a timer to expire after X seconds, minutes, or hours etc., where X can be determined from a configuration file or in other ways. In step 218, ITSE 114 waits for the timer to expire or for user 101 to indicate that he/she is finished with the practical exercise. After step 218, control may pass to step 220.

In step 220, ITSE 114 evaluates how well user 101 performed the exercise and determines a "score" for the exercise (e.g., gives user 101 a number of points based on how well user 101 performed the exercise or simply indicates that user 101 either passed or failed the exercise). In one embodiment, ITSE 114 evaluates how well user 101 performed the exercise by, for example, examining the state of the virtual machines (i.e., the changes the test taker made to the virtual machine) and comparing the state of the virtual machines to a benchmark. This enables ITSE 114 to determine whether user 101 completed the required tasks (i.e., made the appropriate changes to the virtual machines) and whether user 101 made a change to a virtual machine that was not required.

As an example, a task may require user 101 to delete, create, and/or modify one or more particular files stored within one of the virtual machine's disk image file. Thus, in evaluating whether user 101 completed the task successfully, ITSE 114 may examine the virtual machine's disk image file or other file within file set 172 to determine whether user 101 deleted, created, and/or modified the one or more particular files.

Additionally, if user 101 should have modified a particular file in a particular way, the particular file is examined to see if user 101 modified the file appropriately. Also, ITSE 114 may examine the virtual machine's disk image or other file to determine which files user 101 deleted, created, and/or modified to determine if user 101 deleted, created, and/or modified a file that should not have been deleted, created, or modified. Points may be given to user 101 if user 101 deleted, created, and/or modified the appropriate files in the appropriate manner, and points may be deducted if user 101 deleted, created, and/or modified a file that was not required to be deleted, created, or modified.

In one embodiment, database 170 may store file identifiers that identify the one or more particular files and associate these file identifiers with the practical exercise. Thus, ITSE 114 may retrieve from database 170 the file identifiers that identify the files that ITSE 114 should examine in evaluating how well user 101 performed the practical exercise. Additionally, database 170 may store file identifiers that identify benchmark files associated with the practical exercise. In one embodiment, ITSE 114 compares the files that user 101 should have modified or created to a benchmark file. By comparing the files that user 101 should have modified or created to the benchmark files, ITSE 114 can determine whether user 101 made the appropriate changes to the files.

After step 220, control passes to step 222. In step 222, ITSE 114 determines whether user 101 has finished the exam specified by test file 190. If user 101 has finished the exam, control passes to step 224, otherwise control proceeds back to step 204. In step 224, ITSE 114 may grade the exam and display the results of the exam to user 101.

In an alternative embodiment, ITSE 114 does not evaluate how well user 101 performed the practical exercises. In this embodiment, the virtual machine files 172 are provided (e.g., electronically transmitted) to an evaluation center. The evaluation center may include computers that have the software for examining the files 172 to evaluate how well the user performed the practical exercises. Alternatively, a person can manually examine the files 172 to evaluate how well the user performed the practical exercises.

Figure 3:
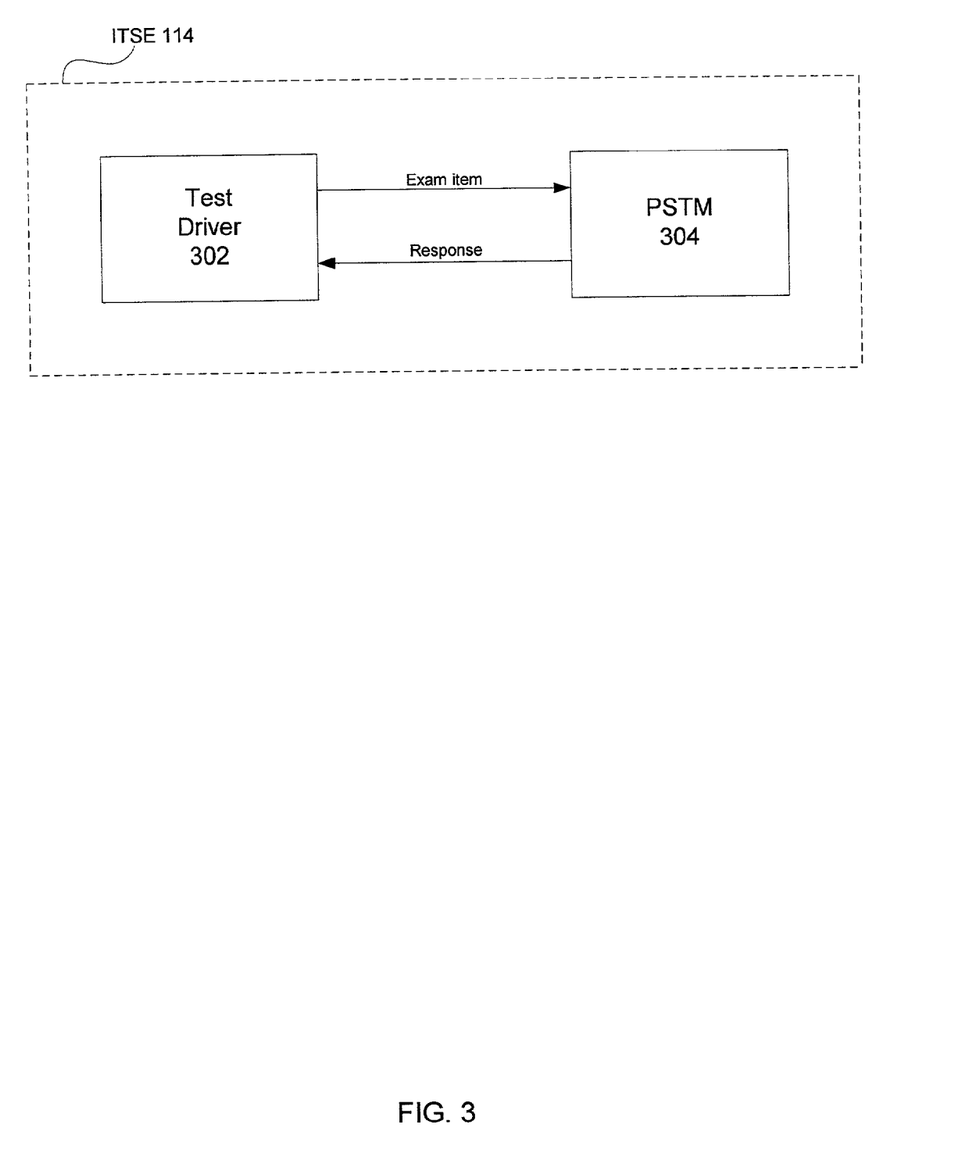
FIG. 3 is a functional block diagram of one embodiment of the IT skills evaluator.

FIG. 3 is a block diagram of a one possible embodiment of ITSE 114. This embodiment is shown for the purpose of illustration, not limitation. One skilled in the art will recognize that there are a wide variety of ways to implement skills evaluator 114. As shown in FIG. 3, ITSE 114 includes a conventional test driver 302 and a practical skills testing module (PSTM) 304, which may include one or more software modules. Test driver 302 may be obtained from NCS Pearson, Inc., which provides the VUE™ computer-based test delivery service, or from Prometric, Inc. of Baltimore, Md. Other Test drivers may also be used.

Figure 4:
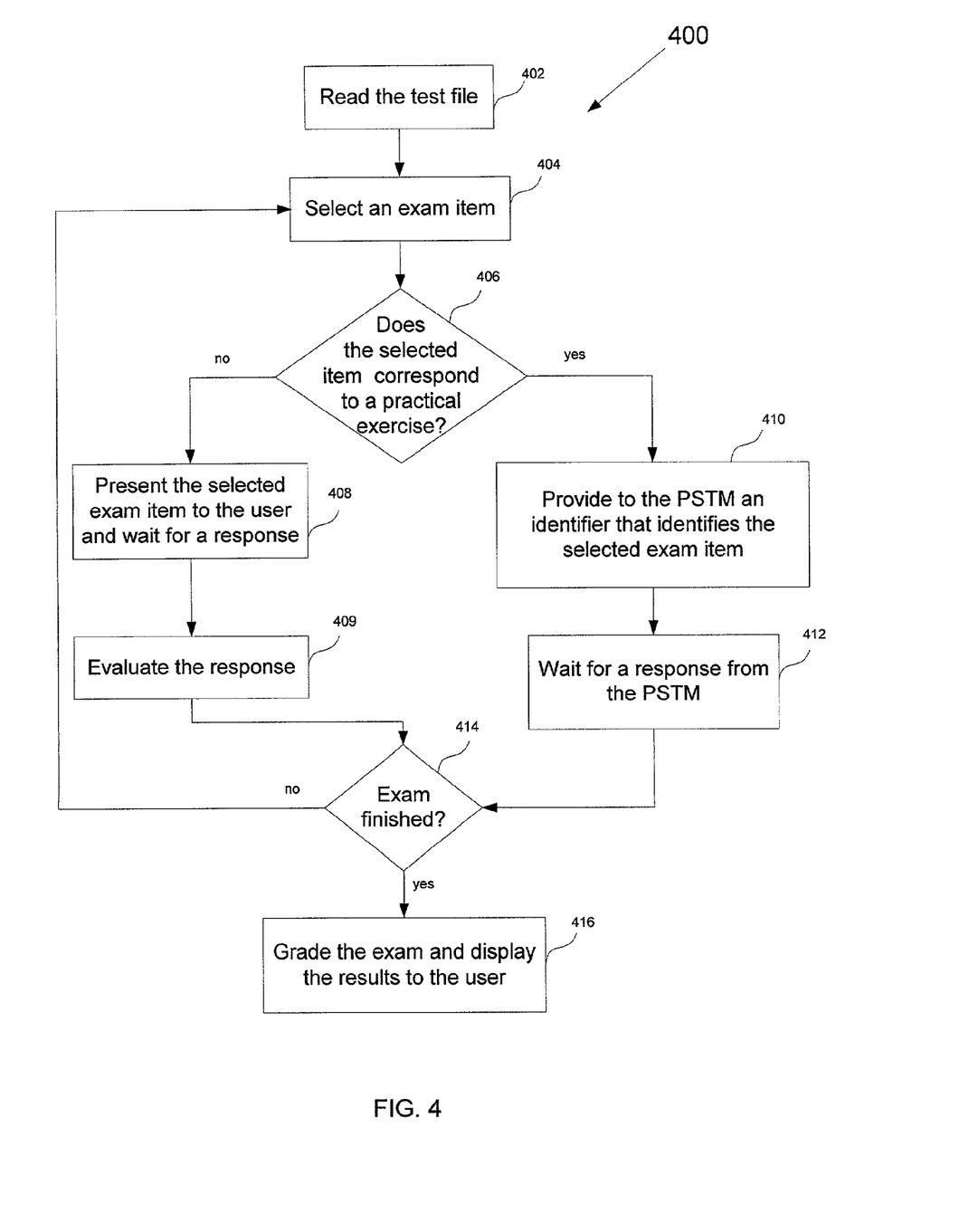
FIG. 4 is a flow chart illustrating a process performed by a test driver.

FIG. 4 is a flow chart illustrating a process 400, according to one embodiment, that is performed by test driver 302. Process 400 may begin in step 402, where driver 302 reads test file 190. Test file 190 specifies an exam having one or more exam items. In step 404, driver 302 selects an exam item specified in test file 190. In step 406, driver 302 determines whether the selected exam item corresponds to a practical exercise. If it does correspond to a practical exercise control passes to step 410, otherwise control passes to step 408.

In step 408, driver presents the exam item to user 101 and waits for user 101 to provide a response. In step 409, driver 302 evaluates the response (e.g., driver 302 determines whether user 101 correctly answered the question). After step 409, control passes to step 414.

In step 410, driver 302 provides to PSTM 304 an identifier that identifies the exam item selected in step 404. In step 412, driver waits for a response from PSTM 304. The response may include information that indicates how well user 101 performed the practical exercise corresponding to the selected exam item. After step 412, control passes to step 414.

In step 414, driver 302 determines whether user 101 has finished the exam. If user 101 has finished the exam, control passes to step 416, otherwise control proceeds back to step 404. In step 416, driver 302 may grade the exam and display the results of the exam to user 101.

Figure 5:
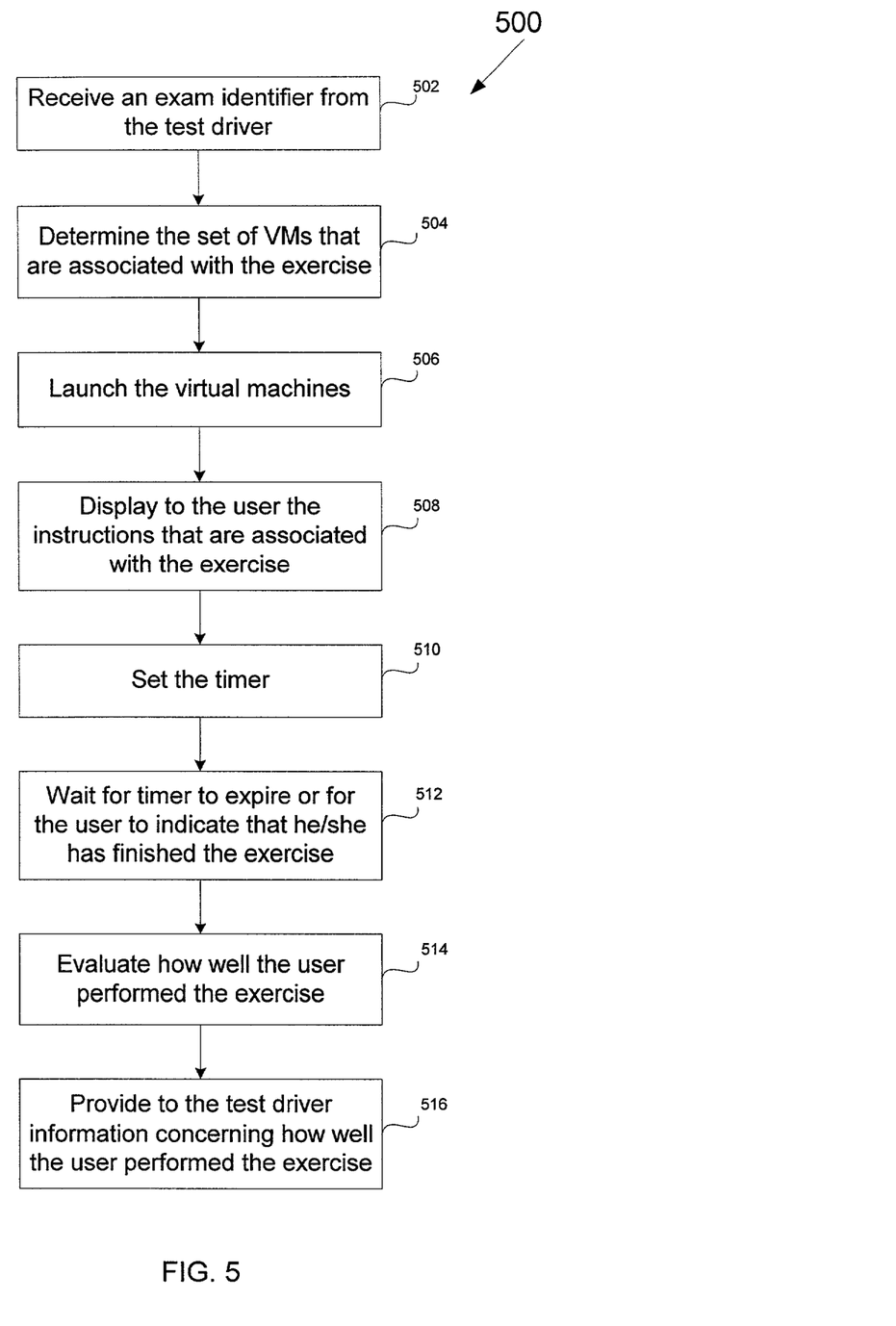
FIG. 5 is a flow chart illustrating a process performed by a practical skills testing module.

FIG. 5 is a flow chart illustrating a process 500, according to one embodiment, that is performed by PSTM 304. Process 500 may begin in step 502, where PSTM 304 receives from driver 302 an identifier that identifies an exam item. The exam item identifies a practical exercise, which is associated with one or more virtual machines.

In step 504, PSTM 304 determines the virtual machines that are associated with the identified practical exercise. In one embodiment, a database 170 is employed to associate exam item identifiers with virtual machine identifiers that identify the virtual machines with which the identified practical exercise is associated. In this embodiment, after PSTM 304 receives the exam item identifier from driver 302, PSTM 304 submits to database 170 a query that includes the exam item identifier and that requests database 170 to return the virtual machine identifiers that are associated with the exam item identifier.

In step 506, PSTM 304 launches the one or more virtual machines determined in step 504. The virtual machines are pre-configured so that they will have the necessary utilities and provide the necessary functions for user 101 to complete the tasks required by the practical exercise. Advantageously, a suspended state file may be created for each of the virtual machines so that, after a virtual machine is launched, the virtual machine is placed automatically into a particular state defined by the virtual machine's suspended state file.

Figure 6:
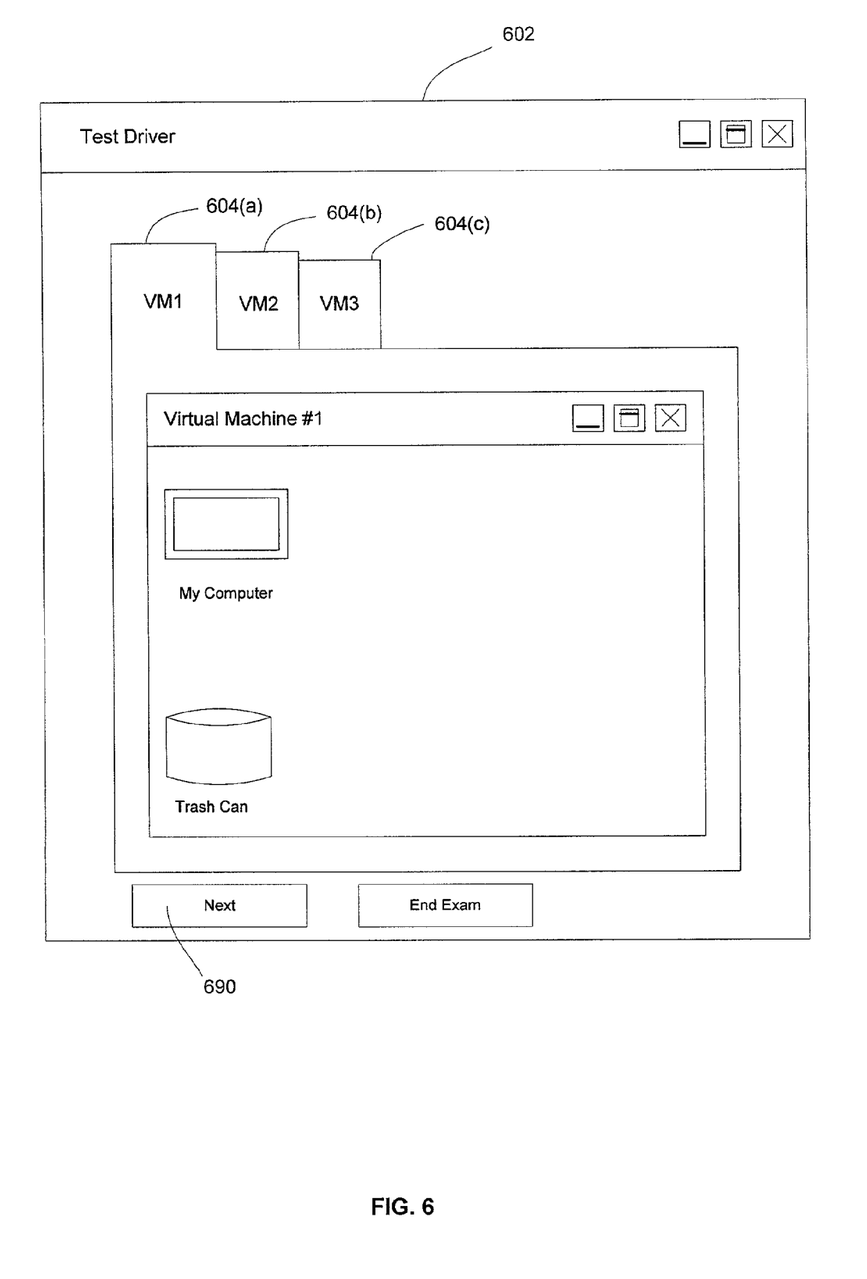
FIG. 6 illustrates a virtual machine displayed within a testing window provided by the test driver.

Preferably, the virtual machines are presented to user 101 in a testing window 602 provided by driver 302 (see FIG. 6). That is, the user interface generated by a virtual machine's operating system is displayed to user 101 so that user 101 may interact with the virtual machine's operating system, applications, and data files. In the embodiment shown in FIG. 6, each virtual machine is presented to user 101 in an easy to use tabbed interface. That is, window 602 includes a tab 604 for each virtual machine that was launched in step 504. In the example shown in FIG. 6, there are three tabs (tab 604(a), tab 604(b), and tab 604(c)). Thus, three virtual machines (e.g., VM1, VM2, and VM3) where launched in step 504. When user 101 wants to use VM3, user selects tab 604(c). After user 101 selects tab 604(c), VM3 is presented to user 101. Similarly, when user 101 wants to use VM1 or VM2, user 101 selects tab 604(a) or 604(b), respectively.

In step 508, PSTM 304 displays to user 101 information that is associated with the identified practical exercise. This information may be retrieved from database 170 where it is stored and associated with the exam item identifier. The information describes the practical exercise's scenario and the tasks that user 101 must perform to successfully complete the exercise. At this point, user 101 performs the tasks, which typically require user 101 to delete, create, and/or modify one or more particular files stored on one or more of the virtual machines' disk image files (i.e., configure a piece of software installed on a virtual machine or a hardware device "connected" to a virtual machine).

In step 510, PSTM 304 sets a timer to expire after X seconds, minutes, or hours etc., where X can be determined from a configuration file. In step 512, PSTM 304, waits for the timer to expire or for user 101 to indicate that he/she is finished with the practical exercise. User 101 may indicate that he/she is finished with the practical exercise by selecting "Next" button 690 (see FIG. 6). After step 512, control may pass to step 514.

In step 514, PSTM 304 evaluates how well user 101 performed the exercise and determines a score for the exercise (i.e., gives user 101 a number of points based on how well user 101 performed the exercise). In step 516, PSTM 304 provides to driver 302 information concerning how well user 101 performed the exercise including user 101's score for the exercise.

While the processes illustrated herein may be described as a series of consecutive steps, none of these processes are limited to any particular order of the described steps. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. A computer implemented method for evaluating a user's information technology skills by having the user complete an information technology examination including information technology exercises using one or more virtual machines, the method comprising the steps of:

associating information technology (IT) exercises with one or more of a plurality of virtual machines;

for each of the IT exercises, pre-configuring each of the one or more of the plurality of virtual machines with at least a set of virtual machine files, wherein the set of virtual machine files determines a virtual machine state and an operating system;

for a selected IT exercise, launching the one or more of the plurality of virtual machines associated with the IT exercise in the virtual machine state and operating system, using the set of virtual machine files;

displaying to the user, information that is associated with the IT exercise, wherein the information describes tasks that the user is instructed to complete for the IT exercise, and monitoring the tasks performed by the user on the set of virtual machine files of the one or more of the plurality of virtual machines, wherein the performed tasks place the one or more of the plurality of virtual machines into a new state; and comparing the new state with an expected new state for the IT exercise to evaluate how well the user performed the IT exercise.

2. The method of claim 1, further comprising:

setting a timer to expire after a certain amount of time has elapsed;

waiting for the user to complete the IT exercise and/or for the timer to expire; and evaluating how well the user performed the IT exercise after completion or after the timer expires.

3. The method of claim 1, wherein the one or more of the plurality of virtual machines include a first virtual machine that is configured to run a first operating system and a second virtual machine that is configured to run a second operating system different from the first operating system.

4. The method of claim 1, wherein the tasks require the user to modify at least one particular file of the set of virtual machine files.

5. The method of claim 4, wherein the act of evaluating how well the user performed the IT exercise comprises examining the modifications made to the at least one particular file to determine whether the particular file was modified correctly.

6. A computer implemented method for evaluating a user's information technology skills by having the user complete an information technology examination, the method comprising the steps of:

accessing a test file comprising one or more exam items;

presenting one or more exam items to the user, wherein the examination items include at least one of an information technology (IT) exercise, a multiple choice question, and an essay question, and wherein the IT exercise is associated with one or more of a plurality of virtual machines;

selecting one of the one or more exam items;

determining whether the selected exam item is an IT exercise;

launching, if the selected exam item is an IT exercise, the one or more of the plurality of virtual machines associated with the IT exercise and that are each pre-configured with at least a set of virtual machine files associated with the IT exercise, wherein the set of virtual machine files determines a virtual machine state and operating system;

displaying to the user, information that is associated with the IT exercise, wherein the information describes tasks that the user is instructed to complete for the IT exercise, and monitoring the tasks performed by the user on the set of virtual machine files of the one or more of the plurality of virtual machines wherein the performed tasks place the one or more of the plurality of virtual machines into a new state;

comparing the new state with an expected new state for the IT exercise to evaluate how well the user performed the IT exercise; and presenting, if the selected exam item is determined to be at least one of a multiple choice question and an essay question, the exam item to the user and waiting for a user response.

7. The method of claim 6, further comprising:

setting a timer to expire after a certain amount of time has elapsed;

waiting for the user to complete the exercise and/or for the timer to expire; and evaluating how well the user performed the IT exercise after completion or after the time expires.

8. The method of claim 6, wherein the one or more of the plurality of virtual machines include a first virtual machine that is configured to run a first operating system and a second virtual machine that is configured to run a second operating system different from the first operating system.

9. The method of claim 6, wherein the tasks require the user to modify at least one particular file of the set of virtual machine files.

10. The method of claim 9, wherein the act of evaluating how well the user performed the IT exercise comprises examining the modifications made to the at least one particular file to determine whether the particular file was modified correctly.

11. The method of claim 9, wherein the act of evaluating how well the user performed the IT exercise comprises examining a file that was not supposed to be modified in performing the IT exercise.

12. An information technology skills evaluation system including an information technology examination, the system comprising:

a storage medium;

a first software application stored on the storage medium for allowing multiple virtual machines to run on a single computer system;

a second software application stored on the storage medium and configured to present one or more exam items to a user, wherein the exam items include information technology (IT) exercises and at least one of a multiple choice question and an essay question, and wherein one or more of the multiple virtual machines are associated with each of the IT exercises;

a set of virtual machine files stored on the storage medium and associated with each of the IT exercises and the one or more of the multiple virtual machines, wherein each set of virtual machine files determines a virtual machine state and operating system associated with each IT exercise;

a processor for executing the first and second software applications, wherein the second software application is operable to:

launch the one or more of the multiple virtual machines associated with a selected IT exercise in the virtual machine state and operating system, using the set of virtual machine files;

display to the user, information that is associated with the IT exercise, wherein the information describes tasks that the user is instructed to complete for the IT exercise;

monitor the user performing tasks on the set of virtual machine files of the one or more of the multiple virtual machines, wherein the performed tasks place the one or more of the multiple virtual machines associated with the IT exercise into a new state; and compare the new state with an expected new state for the IT exercise to evaluate how well the user performed the IT exercise.

13. The system of claim 12, wherein the second software application is further operable to:

set at timer to expire after a certain amount of time has elapsed;

wait for the user to complete the IT exercise and/or for the timer to expire; and evaluate how well the user performed the IT exercise after completion or after the timer expires.

14. The system of claim 12, wherein the second software application comprises a test driver and a practical skills testing module (PSTM).

15. The system of claim 14, wherein the test driver is operable to:

read a test file that comprises the one or more exam items;

select an exam item;

determine whether the selected exam item is associated with the IT exercise;

provide an exam item identifier to the PSTM if it is determined that the exam item is associated with an IT exercise, wherein the exam item identifier identifies the selected exam item; and wait for a response from the PSTM after providing the exam item identifier to the PSTM.

16. The system of claim 14, wherein the second software application displays the virtual machines in a testing window provided by the test driver.

17. The system of claim 12, wherein the virtual machines include a first virtual machine that is configured to run a first operating system and a second virtual machine that is configured to run a second operating system different from the first operating system.

18. An information technology (IT) skills evaluation system for evaluating a user's IT skills including an information technology examination, the system comprising:

a test file comprising one or more exam item, wherein the one or more exam items include IT exercises and at least one of a multiple choice question and an essay question, and wherein the IT exercises are associated with one or more of a plurality of virtual machines;

a storage medium that stores a set of virtual machine files associated with each of the IT exercises and the one or more of a plurality of virtual machines, wherein each set of virtual machine files determines a virtual machine state and operating system associated with each IT exercise;

an exam item presenter that presents the one or more exam items to the user, wherein the exam item presenter comprises a virtual machine launcher that launches the one or more of the plurality of virtual machines in the virtual machine state and operating system when the IT exercise is presented to the user;

a display that displays to the user, information that is associated with the IT exercise, wherein the information describes tasks that the user is instructed to complete for the IT exercise; and an exercise evaluator that evaluates how well the user performed the IT exercise.

19. The system of claim 18, wherein the exercise evaluator evaluates how well the user performed the IT exercise by examining at least one of the virtual machine files.

20. The system of claim 19, wherein in examining the at least one virtual machine file the evaluator checks a predetermined file stored within the set of virtual machine files to determine whether the user modified the file correctly.

21. The system of claim 18, wherein the one or more of the plurality of virtual machines include a first virtual machine that is configured to run a first operating system and a second virtual machine that is configured to run a second operating system different from the first operating system.

22. A computer program product for evaluating a user's information technology skills by having the user complete an information technology examination including information technology exercises using one or more virtual machines, the computer program product being embodied in a computer readable medium and comprising computer instructions for:
   associating information technology (IT) exercises with one or more of a plurality of virtual machines;
   for each of the IT exercises, pre-configuring each of the one or more of the plurality of virtual machines with at least a set of virtual machine files, wherein the set of virtual machine files determines a virtual machine state and an operating system;
   for a selected IT exercise, launching the one or more of the plurality of virtual machines associated with the IT exercise in the virtual machine state and operating system, using the set of virtual machine files;
   displaying to the user, information that is associated with the IT exercise, wherein the information describes tasks that the user is instructed to complete for the IT exercise, and
   monitoring the tasks performed by the user on the set of virtual machine files of the one or more of the plurality of virtual machines wherein the performed tasks place the one or more of the plurality of virtual machines into a new state; and
   comparing the new state with an expected new state for the IT exercise to evaluate how well the user performed the IT exercise.

23. The computer program product of claim 22, further comprising computer instructions for:
   setting a timer to expire after a certain amount of time has elapsed;
   waiting for the user to complete the IT exercise and/or for the timer to expire; and
   evaluating how well the user performed the IT exercise after completion or after the timer expires.

24. The computer program product of claim 23, wherein the tasks require the user to modify at least one particular file of the set of virtual machine files.

25. The computer program product of claim 24, wherein the act of evaluating how well the user performed the IT exercise comprises computer instructions for examining the modifications made to the particular file to determine whether the at least one particular file was modified correctly.

26. The computer program product of claim 22, wherein the one or more of the plurality of virtual machines include a first virtual machine that is configured to run a first operating system and a second virtual machine that is configured to run a second operating system different from the first operating system.

27. A computer program product for evaluating a user's information technology skills by having the user complete an information technology examination, the computer program product being embodied in a computer readable medium and comprising computer instructions for:
   accessing a test file comprising one or more exam items;
   presenting one or more exam items to the user, wherein the exam items include at least one of an information technology (IT) exercise, a multiple choice question, and an essay question and wherein the IT exercise is associated with one or more of a plurality of virtual machines;
   selecting one of the one or more exam items;
   determining whether the selected exam item is an IT exercise; and
   launching, if the selected exam item is an IT exercise, the one or more of a plurality of virtual machines associated with the IT exercise and that are each pre-configured with at least a set of virtual machine files associated with the IT exercise, wherein the set of virtual machine files determines a virtual machine state and an operating system;
   displaying to the user, information that is associated with the IT exercise, wherein the information describes tasks that the user is instructed to complete for the IT exercise, and
   monitoring the tasks performed by the user on the set of virtual machine files of the one or more of the plurality of virtual machines wherein the performed tasks place the one or more of the plurality of virtual machines into a new state;
   comparing the new state with an expected new state for the IT exercise to evaluate how well the user performed the IT exercise; and
   presenting, if the selected exam item is determined to be at least one of a multiple choice question and an essay question, the exam item to the user and waiting for a user response.

28. The computer program product of claim 27, further comprising computer instructions for:
   setting a timer to expire after a certain amount of time has elapsed;
   waiting for the user to complete the exercise and/or for the timer to expire; and
   evaluating how well the user performed the IT exercise after completion of after the time expires.

29. The computer program product of claim 27, wherein the tasks require the user to modify at least one particular file of the set of virtual machine files, and wherein the computer instructions for evaluating how well the user performed the IT exercise comprises computer instructions for examining the modifications made to the particular file to determine whether the particular file was modified correctly.

30. The computer program product of claim 29, wherein the act of evaluating how well the user performed the IT exercise comprises examining a file that was not supposed to be modified in performing the IT exercise.

31. The computer program product of claim 27, wherein the one or more of the plurality of virtual machines include a first virtual machine that is configured to run a first operating system and a second virtual machine that is configured to run a second operating system different from the first operating system.

* * * * *

UNITED STATES PATENT AND TRADEMARK OFFICE
CERTIFICATE OF CORRECTION

| | | |
|---|---|---|
| PATENT NO. | : 7,331,791 B2 | Page 1 of 1 |
| APPLICATION NO. | : 10/087977 | |
| DATED | : February 19, 2008 | |
| INVENTOR(S) | : David Dean Rowley et al. | |

It is certified that error appears in the above-identified patent and that said Letters Patent is hereby corrected as shown below:

On the title page, under Item (75) Inventors: add the following inventor:

--Sean D. Gale, Pleasant Grove, UT (US)--.

Signed and Sealed this

Sixteenth Day of June, 2009

JOHN DOLL
*Acting Director of the United States Patent and Trademark Office*